(12) United States Patent
Tannenbaum et al.

(10) Patent No.: US 10,496,578 B2
(45) Date of Patent: Dec. 3, 2019

(54) CENTRAL ARBITRATION SCHEME FOR A HIGHLY EFFICIENT INTERCONNECTION TOPOLOGY IN A GPU

(71) Applicant: Samsung Electronics Co., Ltd., Suwon-si, Gyeonggi-do (KR)

(72) Inventors: David C. Tannenbaum, Austin, TX (US); Mitchell K. Alsup, Austin, TX (US); Srinivasan S. Iyer, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 130 days.

(21) Appl. No.: 15/713,585

(22) Filed: Sep. 22, 2017

(65) Prior Publication Data

US 2018/0196771 A1 Jul. 12, 2018

Related U.S. Application Data

(60) Provisional application No. 62/443,123, filed on Jan. 6, 2017.

(51) Int. Cl.
*G06F 13/20* (2006.01)
*G06F 13/366* (2006.01)
*G06F 13/40* (2006.01)

(52) U.S. Cl.
CPC ........ *G06F 13/366* (2013.01); *G06F 13/4031* (2013.01)

(58) Field of Classification Search
None
See application file for complete search history.

(56) References Cited

U.S. PATENT DOCUMENTS

| 8,713,264 B2 | 4/2014 | Henriksson et al. |
| 9,294,402 B2 * | 3/2016 | Yamaguchi ........... H04L 49/109 |
| 2011/0022754 A1 | 1/2011 | Cidon et al. |
| 2011/0026400 A1 | 2/2011 | Harrand et al. |
| 2011/0066825 A1 | 3/2011 | May |

FOREIGN PATENT DOCUMENTS

KR 20170015000 A 2/2017

* cited by examiner

*Primary Examiner* — Cheng Yuan Tseng
(74) *Attorney, Agent, or Firm* — Renaissance IP Law Group LLP

(57) ABSTRACT

According to one general aspect, an apparatus may include a network of node circuits and a central arbiter circuit. The network of node circuits is within an integrated circuit, wherein the network includes a plurality of segments. The central arbiter circuit may be configured to schedule a routing of a message between a pair of node circuits in the network, wherein the routing includes a guaranteed latency between the pair of node circuits.

17 Claims, 5 Drawing Sheets

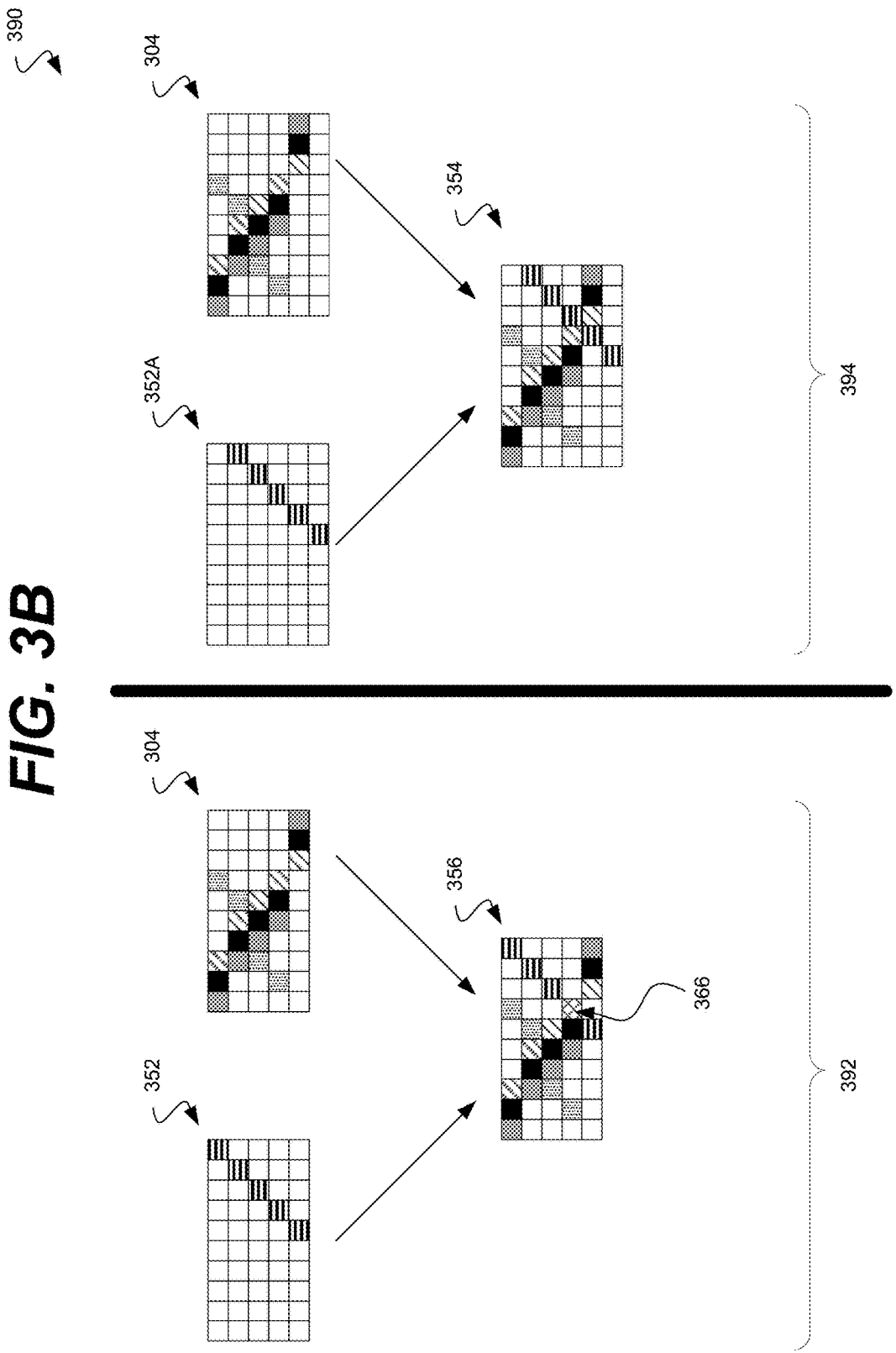

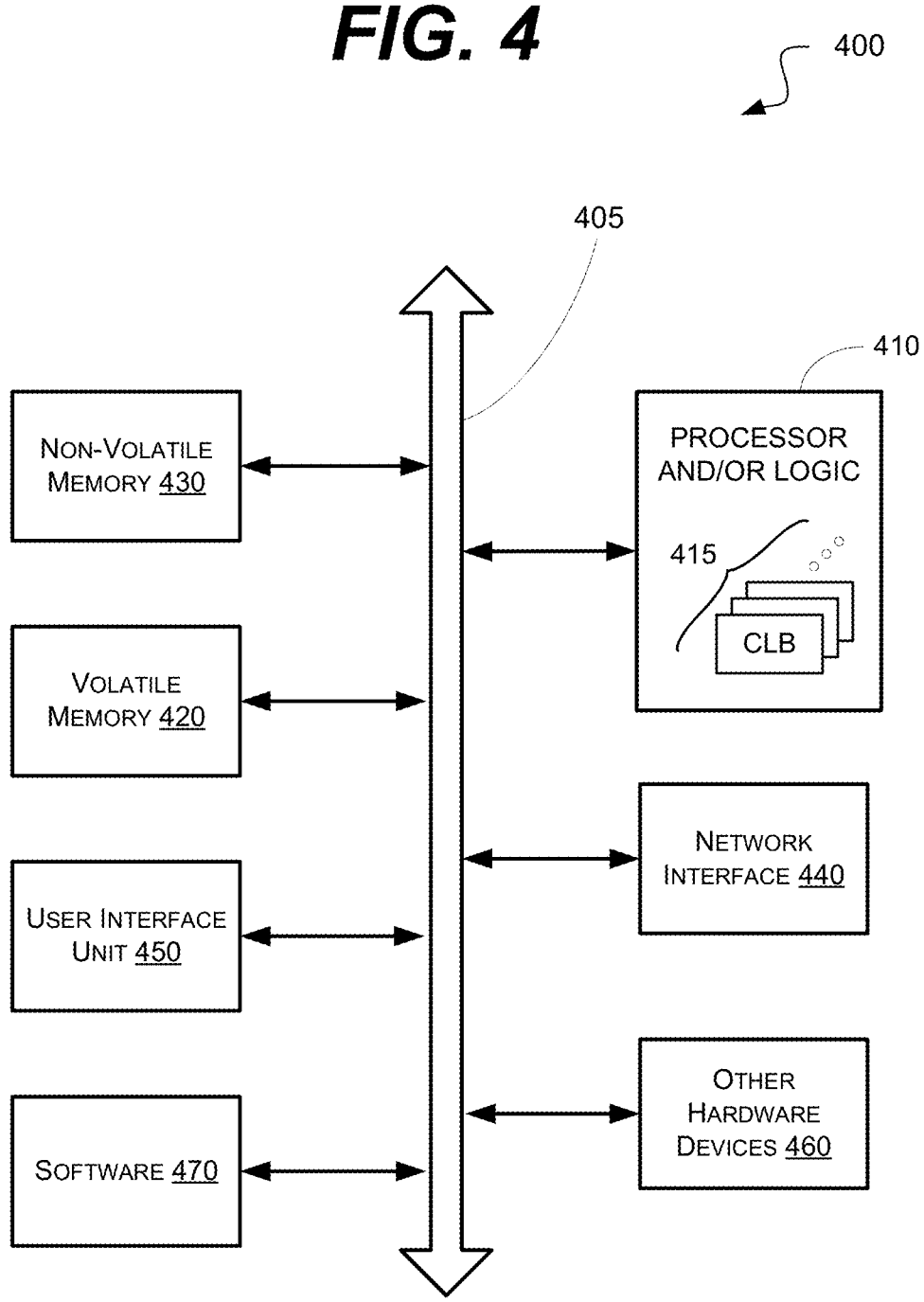

CENTRAL ARBITRATION SCHEME FOR A HIGHLY EFFICIENT INTERCONNECTION TOPOLOGY IN A GPU

CROSS-REFERENCE TO RELATED APPLICATION

This application claims priority under 35 U.S.C. § 119 to Provisional Patent Application Ser. No. 62/443,123, entitled "CENTRAL ARBITRATION SCHEME FOR A HIGHLY EFFICIENT INTERCONNECTION TOPOLOGY IN A GPU" filed on Jan. 6, 2017. The subject matter of this earlier filed application is hereby incorporated by reference.

TECHNICAL FIELD

The present disclosure is generally related to circuits. In particular, the present disclosure relates to an apparatus for a central arbitration scheme for a highly efficient interconnection topology in a processor.

BACKGROUND

In computer architecture, a bus is a communication system that transfers data between components inside a computer, or between elements of a computer. The expression generally covers all related hardware components (wire, optical fiber). Modern computer buses can use both parallel and bit serial connections, and can be wired in either a multidrop (electrical parallel) or daisy chain topology, or connected by switched hub.

Network on chip or network on a chip (NoC or NOC) is a communication subsystem on an integrated circuit (IC), typically between cores or elements in a system on a chip (SoC). NoCs can span synchronous and asynchronous clock domains or use unclocked asynchronous logic. NoC technology generally applies networking theory and methods to on-chip communication and brings notable improvements over conventional bus interconnections. NoC improves the scalability of SoCs, and the power efficiency of complex SoCs compared to other designs.

Traditionally, ICs may have been designed with dedicated point-to-point connections, with one wire dedicated to each signal. For large designs, in particular, this has several limitations from a physical design viewpoint. The wires occupy much of the area of the chip, and interconnects may dominate both performance and dynamic power dissipation, as signal propagation in wires across the chip requires multiple clock cycles.

Further, traditional network architectures have attempted to employ distributed arbitration, but distributed arbitration can lead to routing inefficiencies and complications. Traditional networks have suffered from variable or unknown latencies between a message's source and target. For example, if a message is sent during a period of low congestion the latency may be low, but if sent during a period of high congestion the latency may be great. As such, the latency through the network may be unknown at the time the sender places the data or message on the network. Conventional solutions are typically geared to lowering the latency of the network, or increasing the throughput of the network.

SUMMARY

According to one general aspect, an apparatus may include a network of node circuits and a central arbiter circuit. The network of node circuits is within an integrated circuit, wherein the network includes a plurality of segments. The central arbiter circuit may be configured to schedule a routing of a message between a pair of node circuits in the network, wherein the routing includes a guaranteed latency between the pair of node circuits.

According to another general aspect, an apparatus may include a central arbiter circuit and a network of node circuits. The network of node circuits may be within an integrated circuit, wherein the network is controlled, at least in part, by the central arbiter. Each node circuit may be communicatively coupled with the central arbiter, and is configured to send a scheduling request to the central arbiter and, in response, receive a scheduled route for a message, the scheduled routing includes a guaranteed latency between a pair of node circuits.

According to another general aspect, an apparatus may include a network of node circuits divided into a plurality of sub-networks, wherein each sub-network is controlled, at least in part, by a respective central arbiter. Wherein each node circuit is part of a respective sub-network and is communicatively coupled with the sub-network's central arbiter, and is configured to send a scheduling request to the sub-network's central arbiter and, in response, receive a scheduled route for a message, the scheduled routing includes a guaranteed latency between a pair of node circuits.

The details of one or more implementations are set forth in the accompanying drawings and the description below. Other features will be apparent from the description and drawings, and from the claims.

An apparatus for a central arbitration scheme for a highly efficient interconnection topology in a processor, substantially as shown in and/or described in connection with at least one of the figures, as set forth more completely in the claims.

BRIEF DESCRIPTION OF THE DRAWINGS

FIG. 3B is a block diagram of an example embodiment of a data structure in accordance with the disclosed subject matter.

FIG. 4 is a schematic block diagram of an information processing system that may include devices formed according to principles of the disclosed subject matter.

Like reference symbols in the various drawings indicate like elements.

DETAILED DESCRIPTION

Figure 1:
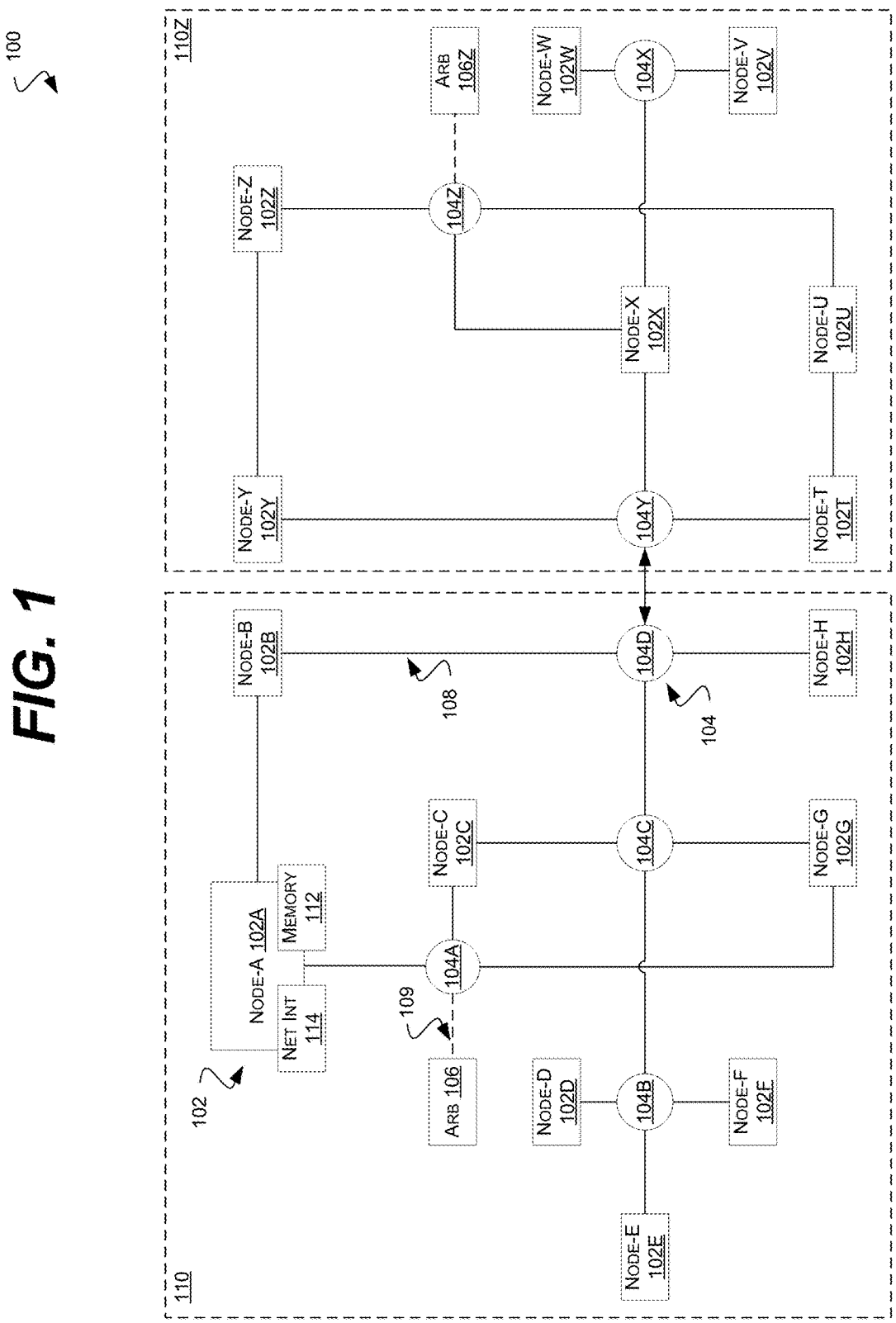
FIG. 1 is a block diagram of an example embodiment of a system in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1 is a block diagram of an example embodiment of a system 100 in accordance with the disclosed subject matter. In various embodiments, the system 100 may be included in a graphics processing unit (GPU), a central processing unit (CPU), a system-on-a-chip (SOC), network-on-a-chip (NoC), or other integrated circuit. In such an embodiment, the communications described herein may be local to the integrated circuit or a specific apparatus or device.

In the illustrated embodiment, the system 100 may include a network 110 of node circuits 102. In various embodiments, the node circuits 102 may include various function unit blocks (FUBs) or combinatorial logic blocks (CLBs) of circuits designed to accomplish a predefined set of functions (e.g., rasterization, deinterlacing, transforming, texturizing, load-store operations). In the illustrated embodiment, the system 100 may include a first network 110 that includes nodes 102A, 102B, 102C, 102D, 102E, 102F, 102G, and 102H; and a second network 110Z that includes nodes 102Z, 102Y, 102W, 102X, 102V, 102U, and 102T. It is understood that the above are merely a few illustrative examples to which the disclosed subject matter is not limited.

In the illustrated embodiment, the nodes 102 within a network 110 may be connected via links or segments 108. In various embodiments, these segments 108 may include portions of a bus or point-to-point network. In various embodiments, the segments 108 may be connected, in part, by crossbar switches or interconnects 104. In various embodiments, the interconnects 104 may include a memory to temporarily house a message or package traveling across the network 110. In another embodiment, the interconnects 104 may not include a memory and may not be able to act as an intermediate or temporary storage point of a route that a message may traverse. It is understood that the above are merely a few illustrative examples to which the disclosed subject matter is not limited.

In the illustrated embodiment, the network 110 may include the crossbar switches or interconnects 104A, 104B, 104C, and 104D. In the illustrated embodiment, the network 110Z may include the crossbar switches or interconnects 104Z, 104Y, and 104X. In the illustrated embodiment, the networks 110 and 110Z may be able to communicate between each other. In various embodiments, each network 110 and 110Z may be referred to as a "horizon" or sub-network.

In the illustrated embodiment, communication within each network 110 and 110Z may be controlled, at least partially, by a central arbitration or arbiter circuit 106 (and 106Z). In such an embodiment, when a source node 102 (e.g., node 102G) wishes to transmit a message to a target node 102 (e.g., node 102B), the source node 102 may request (via a scheduling message) that the central arbiter 106 schedule a route for the message.

In such an embodiment, the central arbiter 106 may be configured to schedule a routing of a message between a pair of node circuits in the network (e.g., between nodes 102G and 102B). Furthermore, the central arbiter 106 may be configured to guarantee latency between the pair of node circuits. In such an embodiment, the source node (e.g., 102G) may be able to accurately plan that once the message is transmitted it will arrive after a certain number (e.g., 3, 4, 7) of clock cycles, regardless of the level of congestion on the network 110. Further, the latency guarantee may include a determined cycle at which the source node is to begin transmission (e.g., 2 cycles after the route has been established).

In various embodiments, the nodes 102 may be configured to communicate with the central arbiter 106 via a communications network separate from the network 110 itself. In such an embodiment, system 100 may include an out-of-band communications channel 109.

In the illustrated embodiment, the scheduling request message may include a target node circuit (e.g., node 102B), and an amount of data to send. In some embodiments, the scheduling request message (sent over out-of-band communications channel 109) may include a desired time when to send the message. In such an embodiment, the source node (e.g., node 102G) may be configured to pre-schedule a message transmission ahead of time so that the time required to schedule the route does not conflict with communications needs of the source node. It is understood that the above is merely one illustrative example to which the disclosed subject matter is not limited.

In such an embodiment, the central arbiter 106 may be configured to determine or plot a route by which the message may travel. To use the example going between nodes 102G and 102B. In various embodiments, only a preferred route between any two nodes may exist. In one embodiment, a number of possible routes may be employed.

In the illustrated embodiment, interconnects 104 may break segments and affect latency, which is mostly done for illustrative purposes. In various embodiments, the interconnects may not count as segments or affect the latency. Likewise, while the nodes 102 are shown as jumps or segments, it is understood that the nodes 102 may not actively forward a message. Instead they may simply include or represent points in which a message may be routed along a path.

A first route may include the segments or jumps from node 102G, to interconnect 104A, to node 102A, to node 102B (having 3 segments or jumps, and assuming 1 cycle per segment a latency of 3 cycles). A second route may include the segments or jumps from node 102G, to interconnect 104C, to node 102C, to interconnect 104A, to node 102A, to node 102B (having 5 segments or a latency of 5 cycles). A third route may include the segments or jumps from node 102G, to interconnect 104C, to interconnect 104D, to node 102B (having 3 segments or a latency of 3 cycles).

The central arbiter 106 may be configured to track all of the scheduled messages, and their associated routes. As described below, this may be done via a multi-dimensional array. The central arbiter 106 may be configured determine which of the candidate routes (e.g., the three candidate routes described above) are possible or do not conflict with existing or scheduled routes. Once a successful candidate route has been selected, the successful route may be added to the tracked scheduled messages (e.g., within the multi-dimensional array). In some embodiments, the central arbiter 106 may need to shift or delay the candidate route in order to avoid a conflict with another scheduled route.

In such an embodiment, the central arbiter 106 may then transmit a scheduling response to the source node (e.g., node 102G). This scheduling response message may include a series of segments via which the message is to traverse (e.g., the segments or candidate route 3), and a scheduled time when the message is to be sent from the source node circuit.

In the illustrated embodiment, because the central arbiter 106 coordinates the routes and the timing or schedule for the message on the network 110, the latency for each message may have a guaranteed or predetermined value. This guaranteed latency may change from message to message but once a message has been scheduled the latency may be fixed. This may remove uncertainties between nodes 102 of the network 110.

Further, this may simplify the design of the nodes 102. In the illustrated embodiment, each node 102 may include a network interface 114 configured to receive and transmit messages via the network 110. Each node 102 may also include, as part of the network interface 114, a memory 112 configured to temporarily store a message transmitted via the network 110.

For example, as a message traverses from node 102G to node 102B, it may be temporarily stored (for a clock cycle) in the memory 112 of node 102A, before being transmitted to node 102B. If the node is the final destination, the message may be moved, for processing, from the network interface's memory 112 to a more permanent memory within the node 102, the message may be finally received.

Traditionally, because the latency and congestion of a network may change after the message has been transmitted, a node may include enough memory to store multiple messages. The traditional node may be required to buffer or warehouse multiple messages as the network becomes backed-up or congested. These memories may be referred to as skid flops or buffer flip-flops.

However, in the illustrated embodiment, each node 102 may only need to include enough memory 112 to store a single message (of whatever the greatest message size of the network 110 may be). Because the central arbiter 106 schedules the message's route, the network 110 is prevented from being backed-up or unexpectedly congested. Therefore, any additional buffer memories are unnecessary.

In such an embodiment, the central arbiter 106 may be configured to avoid more than one message from being stored by a respective non-destination node circuit for more than one cycle of the network. Further, in some embodiments, the central arbiter 106 may be configured to avoid more than one message from being received by a respective node circuit in a cycle of the network.

In the illustrated embodiment, the central arbiter 106 may be configured to prioritize messages (in terms of route and/or timing). In various embodiments, this prioritization may be based upon the nodes 102 themselves (e.g., having more favored nodes), the type of messages, or otherwise.

In various embodiments, the central arbiters 106 and 106Z may be configured to coordinate the transmittal of messages across the networks 110 and 110Z, respectively. In such an embodiment, this may remove or reduce message ordering uncertainties between the networks 110 and 110Z. In such an embodiment, central arbiters 106 and 106Z arrange for inter-network messages to be transmitted at certain times or in predetermined orders.

Figure 2:
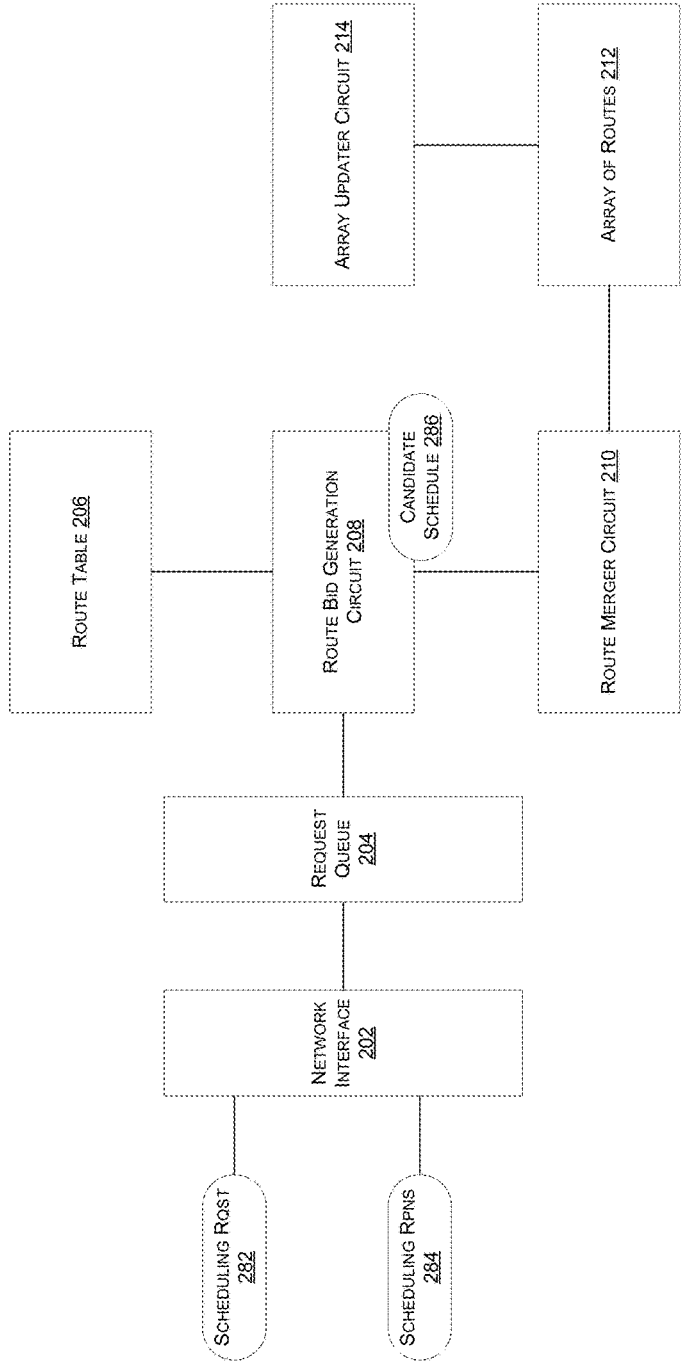
FIG. 2 is a block diagram of an example embodiment of an apparatus in accordance with the disclosed subject matter.

FIG. 2 is a block diagram of an example embodiment of an apparatus or circuit 200 in accordance with the disclosed subject matter. In various embodiments, the circuit 200 may include a central arbiter, as described above.

In the illustrated embodiment, the circuit 200 may include a network interface 202. The network interface 202 may be configured to receive scheduling request messages 282 and transmit scheduling response messages 284. In various embodiments, the network interface 202 may be configured to communicate via a different network than the circuit 200 manages.

In the illustrated embodiment, the circuit 200 may include a request queue 204 configured to queue or store received scheduling requests 282 (or at least portions thereof). In various embodiments, the request queue 204 may enqueue scheduling requests 282 by the respective source nodes. In another embodiment, all of the source nodes, or groupings thereof may share queues. In yet another embodiment, a central arbiter or circuit may be configured to coordinate multiple sub-networks, and may include separate request queues 204 for each respective sub-network. It is understood that the above are merely a few illustrative examples to which the disclosed subject matter is not limited.

In the illustrated embodiment, the circuit 200 may include a route table 206 or other data structure (e.g., a map) that maps the routes possible within the network. In various embodiments, this may be generated dynamically when the circuit 200 is started or first powered up. In another embodiment, this may be predefined or preconfigured.

In the illustrated embodiment, the circuit 200 may include a route bid generation circuit 208. In such an embodiment, the route bid generation circuit 208 may be configured to generate one or more bids or candidate schedules 286. As described below, the candidate schedule 286 may include a list of segments or stops a message may take, and the timing of each segment or stop. As described below, each candidate schedule 286 may be represented as a multi- or two-dimensional array or table.

In various embodiments, the route bid generation circuit 208 may take the next scheduling request 282 from the request queue 204. The route bid generation circuit 208 may determine the source node and the target node. The route bid generation circuit 208 may then select from the route table 206 one or more routes that have the source and target nodes as respective start and end points. If the scheduling request 282 included a time or delay after which the message transmittal may occur, the route bid generation circuit 208 may shift or delay the candidate route 286 accordingly.

In the illustrated embodiment, the circuit 200 may include an array of routes 212. In various embodiments, the array of routes may include two or more dimensions and may include a list of segments or stops all previously scheduled message may take, and the timing of each segment or stop. In such an embodiment, the array of routes 212 may include the routes that have already been scheduled, but not yet followed by the corresponding message.

In the illustrated embodiment, the circuit 200 may include a route merger circuit 210. In various embodiments, the route merger circuit 210 may be configured to merge the candidate schedule 286 into the array of routes 212. If the merger can be accomplished in a non-problematic way, the candidate schedule 286 may be added to the array of routes 212, and a scheduling response message 284 may be transmitted to the source node.

If, on the other hand, the candidate schedule 286 may not be merged with the existing array of routes 212, the route merger circuit 210 or route bid generation circuit 208 may devise a new candidate schedule 286 and try again. This process may repeat until a successful candidate schedule 286 is created. In various embodiments, adjusting the candidate schedule 286 may involve selecting a different path (e.g., given the three routes shown in FIG. 1, if the first path is not mergeable the second path may be tried). In another embodiment, adjusting the candidate schedule 286 may involve shifting the candidate schedule 286 in time, or delaying the candidate schedule 286. It is understood that the above are merely a few illustrative examples to which the disclosed subject matter is not limited.

In various embodiments, the circuit 200 may include an array updater circuit 214. In such an embodiment, the array updater circuit 214 may be configured to maintain a scoreboard of where and when each scheduled message is expected to be within the network. In such an embodiment, the array updater circuit 214 may be configured to periodically update the array of routes 212 (e.g., once a network cycle). In such an embodiment, this may be as simple as shifting the array of routes 212 one time cycle so that unneeded or past route information is no longer stored in the circuit 200's memory. In another embodiment, if a scheduled route is cancelled, it may involve deleting or unmerging the cancelled route from the array of routes 212. It is understood that the above are merely a few illustrative examples to which the disclosed subject matter is not limited.

Figure 3A:
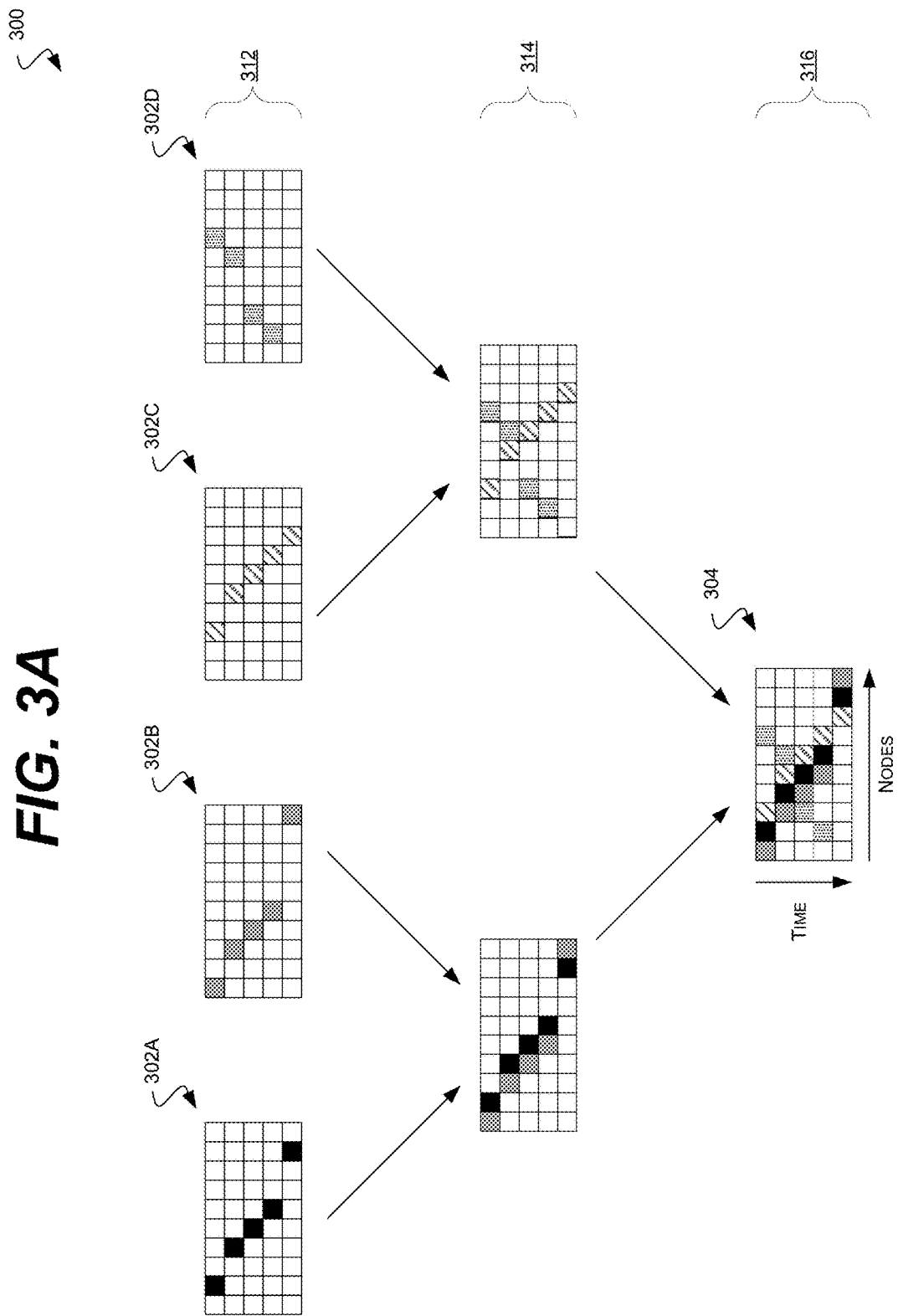
FIG. 3A is a block diagram of an example embodiment of a data structure in accordance with the disclosed subject matter.

FIG. 3A is a block diagram of an example embodiment of a data structure 300 in accordance with the disclosed subject matter. In the illustrated embodiment, the data structure 300 may include a number of candidate routes as they are merged to form an array of scheduled routes.

In the illustrated embodiment, the central arbiter may be configured to process multiple scheduling request substantially simultaneously. Specifically, in the illustrated embodiment, four scheduling requests from four source nodes are shown. It is understood that the above is merely one illustrative example to which the disclosed subject matter is not limited.

At a first stage 312, these four scheduling requests may generate four candidate routes 302A, 302B, 302C, and 302D. As shown these four candidate routes may be represented as two-dimensional arrays or tables, with time as a first axis and the message's position, segments, or receiving nodes as the second axis.

In the illustrated embodiment, each route array (e.g., candidate route 302A) may include 5 cycles (shown in the Y or time axis) and 10 positions (shown in the X or node axis). For example, candidate route 302A (represented by black squares) starts at the second node (the second block on the node axis) and over 5 cycles moves (as illustrated by the time axis) to the ninth node (the ninth block on the node axis). Candidate route 302B (represented by grey squares) starts at the first node and over 5 cycles moves to the tenth node. Candidate route 302C (represented by forward-slashed squares) starts at the third node and over 5 cycles moves to the eighth node. Candidate route 302D (represented by dotted squares) starts at the seventh node and over 4 cycles moves to the second node. It is noted that not every route needs to include the same number of segments or requires the same amount of time to complete. It is understood that the above is merely one illustrative example to which the disclosed subject matter is not limited.

In the illustrated embodiment, for the sake of simplicity it is assumed no pre-scheduled routes exist. If one is inclined one can pretend that one of the candidate routes (routes 302A, 302B, 302C, or 302D) represent the pre-scheduled routes.

One may notice that the two-dimensional arrays 302 look analogous to a train or subway schedule. The various train stations or subway stops are represented on the X-axis and the timing of those stops is represented on the Y-axis. Therefore, one can see where the train (or message) will be at any given time, and what tracks (or network segments or links) the train (or message) will be using. Therefore, as shown in the merging process, conflicts may be relatively easy to spot.

At a second stage 314 of the process, the central arbiter may partially merge the candidate routes 302A, 302B, 302C, and 302D. In the illustrated embodiment, the central arbiter may employ a tree structure, iterative, or recursive process to merge the candidate routes 302. In various embodiments, this may involve more than the three stages shown here. In another embodiment, all of the candidate routes may be merged substantially simultaneously. In various embodiments, the ordering of the mergers may be based upon the starting node, the destination node, the scheduling request's position the queue, or some scheme established to attempt to avoid conflicts. It is understood that the above are merely a few illustrative examples to which the disclosed subject matter is not limited.

In the illustrated embodiment, the candidate routes 302A and 302B may be merged together. The candidate routes 302C and 302D may be merged together. In various embodiments, the ability for each route to occupy one block, segment, or node for a given time (e.g., row) may make detection of any conflicts straightforward. In the illustrated embodiment, no conflicts occur at this stage 314 or the next stage 316. FIG. 3B shows an example in which conflicts may occur.

The final stage 316 of the process shows the final array of routes 304. The four routes are shown as co-existing in time and space. As all of the routes as successfully merged, the central arbiter may transmit scheduling response messages to the respective source or requesting nodes. In various embodiments, the scheduling response messages may include the candidate routes 302A, 302B, 302C, and 302D, respectively. In another embodiment, the scheduling response messages may not include the full two-dimensional arrays but instead a flattened list of the segments, or nodes and when the route is to begin. It is understood that the above are merely a few illustrative examples to which the disclosed subject matter is not limited.

FIG. 3B is a block diagram of an example embodiment of a data structure 390 in accordance with the disclosed subject matter. In the illustrated embodiment, the data structure 390 may include a number of candidate routes as they are merged to form an array of scheduled routes.

In the illustrated embodiment, the central arbiter may already have a number of routes scheduled and stored in the array 304 (shown previously in FIG. 3A). A new scheduling request may have been made and may have resulted in the candidate route 352. Candidate route 352 (represented by horizontally-lined squares) starts at the tenth node and over 5 cycles moves to the sixth node.

In process 392, the central arbiter may attempt to merge the routes 352 and those of the array 304. However, as shown in square 366 (represented by cross-hatching), a conflict has occurred. Both the candidate route 352 and the previously merged, scheduled route 302C (represented by forward-slashed squares) wish to use the seventh segment or node at time 4. Therefore, the central arbiter is unable to successfully merge the candidate route 352 with the array of routes 304. In various embodiments, the candidate route 352 may be deemed to be unsuccessful or to have failed.

In various embodiments, the central arbiter may be configured to take one or more forms of corrective action. In one embodiment, the central arbiter may select a new candidate route that includes different segments or nodes. The central arbiter may then attempt to merge this new candidate route.

In the illustrated embodiment, the central arbiter may be configured to create a new or modified candidate route by postponing the candidate route. In various embodiments, this may be done by shifting the candidate route within the two-dimensional array, thus creating the modified candidate route 352A. Candidate route 352A (represented by horizontally-lined squares) starts at the tenth node on the second cycle, and moves to the sixth node by the sixth cycle.

In one embodiment, shifting the candidate route may include adding another row of time information to the array. In another embodiment, the array may have always included a large number of time rows, but the figures shown may have just omitted the unused ones for the sake of simplicity. In yet another embodiment, central arbiter may simply recycle the candidate route 352 after at least one network cycle has passed and the array of routes 304 has shifted due to the passage of time. It is understood that the above are merely a few illustrative examples to which the disclosed subject matter is not limited.

As shown in process 394, the new candidate route 352A and the array of routes 304 may be successfully merged into the new array of routes 354. As both the route 352A and the route 302C do not wish to use the same segments or nodes at the same time, the substantially simultaneous transmittal of the two respective messages may be possible.

FIG. 4 is a schematic block diagram of an information processing system 400, which may include semiconductor devices formed according to principles of the disclosed subject matter.

Referring to FIG. 4, an information processing system 400 may include one or more of devices constructed according to the principles of the disclosed subject matter. In another embodiment, the information processing system 400 may employ or execute one or more techniques according to the principles of the disclosed subject matter.

In various embodiments, the information processing system 400 may include a computing device, such as, for example, a laptop, desktop, workstation, server, blade server, personal digital assistant, smartphone, tablet, and other appropriate computers or a virtual machine or virtual computing device thereof. In various embodiments, the information processing system 400 may be used by a user (not shown).

The information processing system 400 according to the disclosed subject matter may further include a central processing unit (CPU), logic, or processor 410. In some embodiments, the processor 410 may include one or more functional unit blocks (FUBs) or combinational logic blocks (CLBs) 415. In such an embodiment, a combinational logic block may include various Boolean logic operations (e.g., NAND, NOR, NOT, XOR), stabilizing logic devices (e.g., flip-flops, latches), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 400 according to the disclosed subject matter may further include a volatile memory 420 (e.g., a Random Access Memory (RAM)). The information processing system 400 according to the disclosed subject matter may further include a non-volatile memory 430 (e.g., a hard drive, an optical memory, a NAND or Flash memory). In some embodiments, either the volatile memory 420, the non-volatile memory 430, or a combination or portions thereof may be referred to as a "storage medium". In various embodiments, the volatile memory 420 and/or the non-volatile memory 430 may be configured to store data in a semi-permanent or substantially permanent form.

In various embodiments, the information processing system 400 may include one or more network interfaces 440 configured to allow the information processing system 400 to be part of and communicate via a communications network. Examples of a Wi-Fi protocol may include, but are not limited to, Institute of Electrical and Electronics Engineers (IEEE) 802.11g, IEEE 802.11n. Examples of a cellular protocol may include, but are not limited to: IEEE 802.16m (a.k.a. Wireless-MAN (Metropolitan Area Network) Advanced, Long Term Evolution (LTE) Advanced, Enhanced Data rates for GSM (Global System for Mobile Communications) Evolution (EDGE), Evolved High-Speed Packet Access (HSPA+). Examples of a wired protocol may include, but are not limited to, IEEE 802.3 (a.k.a. Ethernet), Fibre Channel, Power Line communication (e.g., Home-Plug, IEEE 1901). It is understood that the above are merely a few illustrative examples to which the disclosed subject matter is not limited.

The information processing system 400 according to the disclosed subject matter may further include a user interface unit 450 (e.g., a display adapter, a haptic interface, a human interface device). In various embodiments, this user interface unit 450 may be configured to either receive input from a user and/or provide output to a user. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

In various embodiments, the information processing system 400 may include one or more other devices or hardware components 460 (e.g., a display or monitor, a keyboard, a mouse, a camera, a fingerprint reader, a video processor). It is understood that the above are merely a few illustrative examples to which the disclosed subject matter is not limited.

The information processing system 400 according to the disclosed subject matter may further include one or more system buses 405. In such an embodiment, the system bus 405 may be configured to communicatively couple the processor 410, the volatile memory 420, the non-volatile memory 430, the network interface 440, the user interface unit 450, and one or more hardware components 460. Data processed by the processor 410 or data inputted from outside of the non-volatile memory 430 may be stored in either the non-volatile memory 430 or the volatile memory 420.

In various embodiments, the information processing system 400 may include or execute one or more software components 470. In some embodiments, the software components 470 may include an operating system (OS) and/or an application. In some embodiments, the OS may be configured to provide one or more services to an application and manage or act as an intermediary between the application and the various hardware components (e.g., the processor 410, a network interface 440) of the information processing system 400. In such an embodiment, the information processing system 400 may include one or more native applications, which may be installed locally (e.g., within the non-volatile memory 430) and configured to be executed directly by the processor 410 and directly interact with the OS. In such an embodiment, the native applications may include pre-compiled machine executable code. In some embodiments, the native applications may include a script interpreter (e.g., C shell (csh), AppleScript, AutoHotkey) or a virtual execution machine (VM) (e.g., the Java Virtual Machine, the Microsoft Common Language Runtime) that are configured to translate source or object code into executable code which is then executed by the processor 410.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus comprising:
a network of node circuits within an integrated circuit, wherein the network includes a plurality of segments; and
a central arbiter circuit configured to schedule a routing of a message between a pair of node circuits in the network, wherein the routing includes determining a guaranteed fixed latency between the pair of node circuits via a two-dimensional array that scoreboards where and when each scheduled message is expected to be within the network, wherein the two-dimensional array includes a first axis representing time, and a second axis representing location.

2. The apparatus of claim 1, wherein the network of node circuits comprises a source node circuit and a target node circuit; and wherein the source node circuit is configured to request a schedule of a route between the source node circuit and the target node circuit, and wherein the central arbiter circuit is configured to:
generate at least one candidate route between the source node circuit and the target node circuit, and
merge, in a two-dimensional array, the candidate route between the source node circuit and the target node circuit, with other routes between other node circuits.

3. The apparatus of claim 2, wherein the central arbiter circuit is configured to:
if the candidate route between the source node circuit and the target node circuit, conflicts with one or more other routes between other node circuits, postpone the candidate route by shifting the candidate route within the two-dimensional array.

4. The apparatus of claim 2, wherein the central arbiter circuit is configured to:
avoid more than one message from being stored by a respective non-destination node circuit for more than one cycle of the network; and
avoid more than one message from being received by a respective node circuit in a cycle of the network.

5. The apparatus of claim 1, wherein the central arbiter circuit is configured to update the two-dimensional array at least once every cycle of the network.

6. The apparatus of claim 1, wherein the network of node circuits comprises a source node circuit; and
wherein the source node circuit is configured to:
transmit, to the central arbiter circuit, a scheduling request, wherein the scheduling request comprises a target node circuit, an amount of data to send, and a desired time when to send the message.

7. The apparatus of claim 6, wherein the central arbiter circuit is configured to, in response the scheduling request, transmit a scheduling response to the source node circuit; and
wherein the scheduling response comprises a series of segments via which the message is to traverse, and a scheduled time when the message is to be sent from the source node circuit.

8. The apparatus of claim 1, wherein each node circuit comprises a network interface having just enough memory to store a single message at a time.

9. An apparatus comprising:
a central arbiter circuit;
a network of node circuits within an integrated circuit, wherein the network is controlled, at least in part, by the central arbiter; and
wherein each node circuit is communicatively coupled with the central arbiter, and is configured to send a scheduling request to the central arbiter and, in response, receive a scheduled route for a message, the scheduled routing includes a guaranteed latency between a pair of node circuits,
wherein the central arbiter circuit comprises a two-dimensional array that scoreboards where and when each scheduled message is expected to be within the network, and wherein a first axis of the two-dimensional array represents position, and a second axis of the two-dimensional array represents time.

10. The apparatus of claim 9, wherein the network of node circuits comprises a source node circuit and a target node circuit; and
wherein the central arbiter circuit is configured to, in response to the scheduling request message:
generate at least one candidate route between the source node circuit and the target node circuit, and
merge, in a two-dimensional array, the candidate route between the source node circuit and the target node circuit, with other routes between other node circuits.

11. The apparatus of claim 10, wherein the central arbiter circuit is configured to:
if the candidate route between the source node circuit and the target node circuit, conflicts with one or more other routes between other node circuits, postponing the candidate route by shifting the candidate route within the two-dimensional array.

12. The apparatus of claim 10, wherein the central arbiter circuit is configured to:
avoid more than one message from being stored by a respective non-destination node circuit for more than one cycle of the network; and
avoid more than one message from being received by a respective node circuit in a cycle of the network.

13. The apparatus of claim 9, wherein the central arbiter circuit is configured to update the two-dimensional array at least once every cycle of the network.

14. The apparatus of claim 9, wherein the scheduling request comprises a target node circuit, an amount of data to send, and a desired time when to send the message.

15. The apparatus of claim 14, wherein the central arbiter circuit is configured to, in response the scheduling request, transmit a scheduling response to the source node circuit; and
wherein the scheduling response comprises a series of segments via which the message is to traverse, and a scheduled time when the message is to be sent from the source node circuit.

16. An apparatus comprising:
a network of node circuits divided into a plurality of sub-networks, wherein each sub-network is controlled, at least in part, by a respective central arbiter; and
wherein each node circuit is part of a respective sub-network and is communicatively coupled with the sub-network's central arbiter, and is configured to send a scheduling request to the sub-network's central arbiter and, in response, receive a scheduled route for a message, the scheduled routing includes a guaranteed fixed latency between a pair of node circuits wherein each central arbiter includes:
a two-dimensional array that scoreboards where and when each scheduled message is expected to be within the respective sub-network; and
wherein a first axis of the two-dimensional array represents position, and a second axis of the two-dimensional array represents time.

17. The apparatus of claim 16, each central arbiter includes:
a per network queue that stores scheduling requests from a respective sub-network.

* * * * *